Dec. 2, 1952  A. A. SHAMES  2,619,912
PNEUMATIC APPLICATION FOR GEAR PUMPS
Filed May 17, 1946

Inventor
Albert A. Shames

By M. C. Hayes

Attorney

Patented Dec. 2, 1952

2,619,912

UNITED STATES PATENT OFFICE 2,619,912

PNEUMATIC APPLICATION FOR GEAR PUMPS

Albert A. Shames, Waban, Mass., assignor, by mesne assignments, to the United States of America as represented by the Secretary of the Navy Application May 17, 1946, Serial No. 670,589

3 Claims. (Cl. 103—126)

The present invention relates to improvements in rotary gear pumps and more particularly to gear pumps for pumping air or other gases.

An object of the invention is to provide a gear pump adapted to supply air or other gases under pressure when used in varying atmospheric conditions and at varying altitude.

Another object is the provision of a gear pump so constructed as to be capable of providing air or other gas under pressure to airborne equipment or the like.

Still another object of the invention is to provide in a gear pump such close tolerances and clearances between the parts of the pumping mechanism as to render it suitable for the pumping of air or other gas and thereby developing and maintaining a desired pressure.

Other objects and advantages will appear from the following description taken in connection with the accompanying drawings which are exemplary and in which.

Figure 1:
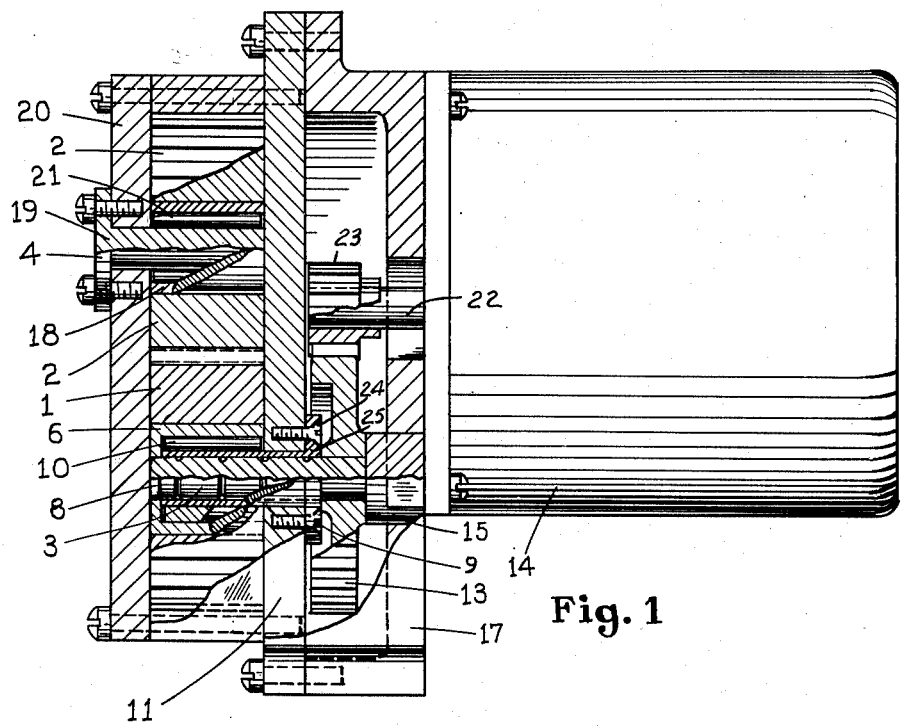
Fig. 1 is a view partly in section of a gear pump embodying the invention.
Figure 2:
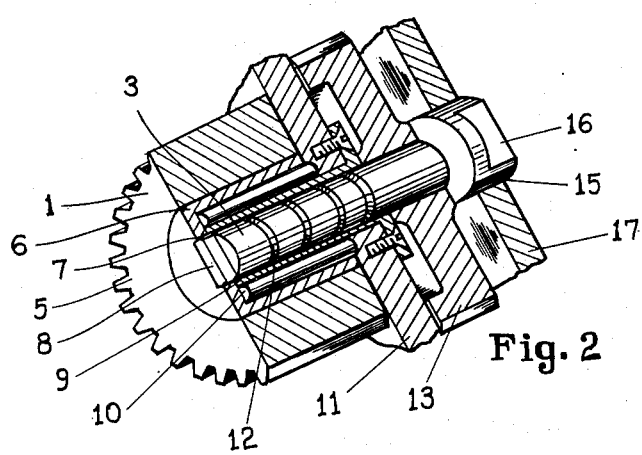
Fig. 2 is a partly sectional perspective view of a portion of the assembly shown in Fig. 1.

The drawings show a gear pump embodying the invention for the pumping and pressurizing of air or gas, and comprising a driver gear 1, a driven gear 2, a driver shaft 3 for driving the driver gear and a shaft 4 supporting the driven gear. The driver gear 1 is provided with beveled teeth 5 around its outer periphery meshing with similar teeth of the driven gear. A center bore is provided through the driver gear and is adapted to receive the sleeve member 6. The sleeve member 6 terminates in a wall at one end and is open at its other end. The walled or closed end of the sleeve 6 has provided therethrough a slot 7 designed to receive the keyed portion 8 of the end of the driver shaft 3. The sleeve member 6 is securely fixed within the bore of the gear 1 in any suitable manner, as by being forcibly inserted therein or by a shrinking process. A tubular stud 9 is provided, which is adapted to be received in the driver gear sleeve 6 and which is smaller than the inner periphery of the sleeve to allow for the insertion of a series of needle bearings 10 between the sleeve and stud. The tubular stud 9 is affixed by screws or the like to a wall or plate member 11 having a hole therethrough for receiving the stud. The screws 24 extend through a flange portion 25 of the tubular stud. The driver shaft 3 is inserted through the bore of the tubular stud member 9 which provides a bearing for the rotary driver shaft. The keyed connection between the key 8 of the driver shaft and the slot in the gear sleeve member 6 provides a drive connection for rotating the driver gear with the shaft. A series of peripheral grooves 12 are provided in the shaft for lubrication purposes and to act as a sealing means to prevent pressure leakage around the shaft. A gear 13 is affixed on the other end of the driver shaft adapting the shaft for driving by a suitable power source 14, preferably an electric motor having a shaft 22 and gear 23 meshing with and driving gear 13. To prevent longitudinal movement or play of the driver shaft 3, a gear thrust pad 15 is provided, which is in the form of a disc and is made of an alloy or any suitable bearing material. This disc shaped pad 15 has one face smoothed and thus is adapted to act as a bearing surface against the end of the driver shaft, and its other face has a key portion 16 thereon to be received in a slot in the rear plate or body member 17.

The driven gear 2 is the same type of gear as is the driving gear and is adapted to mesh with the driver gear and is driven thereby. The driven gear 2 has a central bore adapted to receive a tubular sleeve member 18. The sleeve member 18 is made of a suitable bearing material and is securely fixed within the gear bore. For mounting the driven gear 2 a stud or shaft member 19 is provided. The shaft 19 is inserted through a hole in the face plate member or wall 20 and is affixed thereto. The shaft 19 extends through the gear and is of a smaller diameter than the inner periphery of the bearing sleeve member 18 of the driven gear 2 to provide space for the insertion of a series of needle bearings 21.

The front plate member or wall 20 and the middle plate member or wall 11 form parallel walls of the pressure chamber containing the pump gears 1 and 2. The pump gears are of such size that the clearance between their faces and the plate members is so slight that leakage will be held to a minimum, with the gears maintained free to rotate. Also the clearances and tolerances between the gear teeth and between the gears and pump walls and elsewhere between the parts of the gear pump are such as to keep leakage to a minimum.

According to the invention, a gear pump is provided which is so designed as to be capable of maintaining constant air pressure in airborne or other equipment. Extremely close tolerances and clearances are provided with the design of the gear pump of the invention. The teeth of the gears are so designed, and bearing and gear run out are maintained at not more than .00005 to .0001 inch each, so that the closure of the teeth is nearly complete. The maximum side wall clearance of the gears is .0001 to .0002 inch, attained by optical flat surfaces, and the maximum peripheral clearance of the gears is .0001 to .0002.

The provision of the full floating drive shaft with labyrinth seal decreases friction and prevents the escape of air or gas around the shaft.

Thus there is provided a gear pump for pumping air or gas having the power source geared to a free or full floating driver shaft 3 which extends through the pump wall 11 and through and supported by the tubular stud 9 affixed to the pump wall. The driver gear 1 being mounted on the stud 9 with roller bearings providing for rotation thereon, the stud supports the gear load thus relieving the driver shaft of such load. The driver gear 1 being keyed to the driver shaft 3 for rotation therewith, the rotation of the gear or torque load is thus substantially the only load the driver shaft must bear.

The usual inlet and outlet (not shown) for the air or other gas being pumped, are provided at either side of the pump, and aligned with the point of mesh of the driver and driven gears.

It will be apparent that the invention is not to be limited to the embodiment set forth in the drawings and description, and that variations may be made in form and construction without departing from the spirit and scope of the invention as defined in the appended claims.

I claim:

What is claimed is:

1. In a gear pump comprising a housing having opposite parallel walls and a driver gear and a driven gear rotatable within said housing with their sides in engagement with said housing walls and a driver shaft for said driver gear, a single tubular stud receiving and supporting said driver shaft throughout the major portion of the length of said shaft and constituting the sole support and bearing for said driver shaft, said tubular stud being fixed at one end in one of said opposite parallel walls of the housing and having its opposite end near to the other of said parallel walls of the housing, said single tubular stud constituting the sole rotary bearing for said driver gear, a sleeve fixed within said driver gear and having a substantially closed end wall flush with the side of said driver gear which abuts the said other wall of the housing, means connecting said driver shaft to said fixed sleeve of said driver gear comprising an elongated slot through said end wall portion of said fixed sleeve, said driver shaft having a corespondingly shaped key portion on its end received in said elongated slot in said fixed sleeve of said driver gear for effecting rotation of said driver gear by said driver shaft, said opposite end of said tubuluar stud abutting the inside of said end wall portion of said fixed sleeve of the driver gear with a minimum of clearance therebetween.

2. In a gear pump according to claim 1, said single tubular stud being of less external diameter than the internal diameter of the bore of said fixed sleeve of said driver gear, and rolling bearings positioned therebetween and embraced endwise between the inside of said substantially closed end wall portion of said fixed sleeve of the driver gear and the wall of the housing to which said tubular stud is fixed.

3. In a gear pump according to claim 1, said single tubular stud extending through the said one of the pump housing walls and having a terminal flanged portion outside of said pump housing wall and secured by screws or the like to said wall.

ALBERT A. SHAMES.

REFERENCES CITED

The following references are of record in the file of this patent:

UNITED STATES PATENTS

| Number | Name | Date |
|---|---|---|
| Re. 14,922 | Prouty | July 20, 1920 |
| 1,642,454 | Malmstrom | Sept. 13, 1927 |
| 1,702,046 | Fullerton | Feb. 12, 1929 |
| 1,785,386 | McIntyre | Dec. 16, 1930 |
| 1,925,788 | Carter | Sept. 5, 1933 |

FOREIGN PATENTS

| Number | Country | Date |
|---|---|---|
| 551,052 | Great Britain | Feb. 5, 1943 |